(12) United States Patent
Travis (10) Patent No.: US 10,582,172 B2
(45) Date of Patent: Mar. 3, 2020

(54) OPTICAL SYSTEM STEERING VIA BRAGG GRATING SHEAR

(71) Applicant: Microsoft Technology Licensing, LLC, Redmond, WA (US)

(72) Inventor: Adrian Travis, Paris (FR)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 117 days.

(21) Appl. No.: 15/601,933

(22) Filed: May 22, 2017

(65) Prior Publication Data
US 2018/0338122 A1 Nov. 22, 2018

(51) Int. Cl.
*H04N 9/31* (2006.01)
*G02B 27/01* (2006.01)
*G02B 27/00* (2006.01)
*G02B 26/08* (2006.01)
(Continued)

(52) U.S. Cl.
CPC ......... *H04N 9/3194* (2013.01); *G02B 5/1828* (2013.01); *G02B 6/005* (2013.01); *G02B 6/0028* (2013.01); *G02B 6/0046* (2013.01); *G02B 26/0808* (2013.01); *G02B 27/0093* (2013.01); *G02B 27/0103* (2013.01); *G02B 27/0172* (2013.01); *G02B 27/0176* (2013.01); *H04N 9/315* (2013.01); *H04N 9/3185* (2013.01); *G02B 2027/014* (2013.01); *G02B 2027/0154* (2013.01); *G02B 2027/0178* (2013.01);
(Continued)

(58) Field of Classification Search
CPC .... G02B 6/0028; G02B 6/0046; G02B 6/005; G02B 26/0808; G02B 27/0093; G02B 27/0172; G02B 27/0176; G02B 2027/014; G02B 2027/0154; G02B 2027/0178; G02B 5/1828; G02B 27/0103; G02B 2027/0187; G02B 2027/0185; H04N 9/3194; H04N 9/315; H04N 9/3185
USPC ........... 359/566, 563, 576, 558, 573, 13, 15, 359/630–633
See application file for complete search history.

(56) References Cited

U.S. PATENT DOCUMENTS 4,547,037 A 10/1985 Case
4,807,951 A 2/1989 Moss
7,123,287 B2 10/2006 Surman
(Continued)

FOREIGN PATENT DOCUMENTS

WO 2015192117 A1 12/2015
WO 2016105282 A1 6/2016

OTHER PUBLICATIONS

Adrian Travis et al., "Collimated Light from a Waveguide for a Display Backlight", Optics Express, Oct. 26, 2009, 6 pages, vol. 17, No. 22.
(Continued)

*Primary Examiner* — Jie Lei
(74) *Attorney, Agent, or Firm* — NovoTechIP International PLLC (57) ABSTRACT

An optical system includes a light source, a film positioned to be illuminated by light from the light source, the film including a plurality of Bragg gratings configured to redirect the light, and an actuator configured to apply a shearing force to the film. The shearing force manipulates an orientation of the plurality of Bragg gratings to change an extent to which the plurality of Bragg gratings redirects the light
(Continued)

and to thereby re-position a pupil at which the light converges after redirection by the plurality of Bragg gratings.

19 Claims, 5 Drawing Sheets

(51) Int. Cl.
    *F21V 8/00*     (2006.01)
    *G02B 5/18*     (2006.01)

(52) U.S. Cl.
    CPC ............ *G02B 2027/0185* (2013.01); *G02B 2027/0187* (2013.01)

(56) References Cited

U.S. PATENT DOCUMENTS

| | | |
|---|---|---|
| 7,158,238 B2 | 1/2007 | Latypov et al. |
| 8,467,133 B2 | 6/2013 | Miller |
| 2005/0259269 A1 | 11/2005 | Latypov |
| 2011/0044582 A1 | 2/2011 | Travis et al. |
| 2015/0228226 A1 | 8/2015 | Luebke et al. |
| 2015/0248792 A1 | 9/2015 | Kbovitz et al. |
| 2016/0195720 A1 | 7/2016 | Travis et al. |
| 2017/0115487 A1 | 4/2017 | Travis |

OTHER PUBLICATIONS

Adrian Travis et al., "Virtual Image Display as a Backlight for 3D", Optics Express, Jul. 29, 2013, 6 pages, vol. 21, No. 15.

Adrian, et al., "Wedge guides and pupil steering for mixed reality", in Journal of the Society for Information Display, Mar. 24, 2018, 6 Pages.

"International Search Report and Written Opinion Issued in PCT Application No. PCT/US2018/028985", dated Jul. 26, 2018, 13 Pages.

Sagan, et al., "Electrically Switchable Bragg Grating Technology for Projection Displays", in Proceedings of the International Society for Optics and Photonics, Projection Displays VII, vol. 4294, Jan. 24, 2001, 9 Pages.

OPTICAL SYSTEM STEERING VIA BRAGG GRATING SHEAR

DESCRIPTION OF THE DRAWING FIGURES

For a more complete understanding of the disclosure, reference is made to the following detailed description and accompanying drawing figures, in which like reference numerals may be used to identify like elements in the figures.

The embodiments of the disclosed systems may assume various forms. Specific embodiments are illustrated in the drawing (and are hereafter described) with the understanding that the disclosure is intended to be illustrative, and is not intended to limit the invention to the specific embodiments described and illustrated herein.

DETAILED DESCRIPTION

Wearable electronic devices include a display that produces a virtual image. Virtual images are useful because the human eye has trouble focusing at short distances (e.g., less than a few centimeters). Electronic devices are described that include displays that provide virtual images, despite being sized and configured as near-eye or other wearable electronic devices, such as eyeglasses or other head-mounted display devices. These and other electronic devices may also include other optical systems, such as cameras. The cameras may be used to capture image data of a scene. For instance, the electronic device may be a flat-panel display device having a camera to capture the scene that includes the viewer of the display. In such cases, the camera may establish a virtual window through which two-way image data is shared.

Displays, cameras, and other optical systems that steer light are described. The light is steered by a plurality of Bragg gratings. The light is redirected by (e.g., reflects off of) the Bragg gratings as if the Bragg gratings were a stack of partial mirrors. One or more shearing forces are applied to the Bragg gratings to implement the steering. The shearing force(s) manipulate(s) an orientation of the plurality of Bragg gratings, altering the angle of the mirrors. A pupil at which the light converges after redirection by the Bragg gratings is thus re-positioned. Shearing forces in different directions allow the pupil to be moved in various directions, e.g., left-right and up-down. The shearing force(s) may be variably applied across the film to adjust the distance at which the pupil is provided. The film thus acts as a lens, the focal point of which can be moved forward and backward.

The plurality of Bragg gratings may be disposed in a film. The film may include a superposition of a broad spectrum of Bragg gratings. A range of wavelengths is thus redirected by the film. The Bragg planes of the Bragg gratings may be locally or globally parallel across the film. Varying the angles of the Bragg planes across the film allows the Bragg gratings to converge the light to form the pupil. In some cases, pre-converging light is used to illuminate the film. In such cases, the angle of the Bragg planes may or may not vary.

One or more of the optical systems having Bragg gratings may be incorporated into various types of electronic devices. In display optical systems, a virtual or three-dimensional image with a small pupil is placed or otherwise provided behind the film. Illuminating the film with the light of the image allows the pupil to be steered. Such display steering may be useful to conserve power. For instance, the pupil may be steered so as to follow the eye of the viewer. Other optical systems use the Bragg gratings in connection with image acquisition. In such cases, the steering is used to re-orient or otherwise re-position a camera. Light from selected portions of a scene is thus detected. In still other cases, the optical systems include both display and camera systems that utilize Bragg grating shear for optical steering.

In the display context, the Bragg grating shear may be used to provide a large area beam scanner. The film in which the Bragg gratings are disposed may be arranged as a sheet placed on the surface of a display so that the film alters the direction of rays emerging from the display. The use of a superposition of a spectrum of Bragg gratings allows light of any wavelength (e.g., a broad wavelength spectrum) to be scanned. The steering allows rays of the light to be scanned so as to converge to a pupil or point that can be moved continuously to a desired spatial location.

The steering in the display context may be implemented to minimize or reduce power consumption. Power consumption may be reduced through the lack of wasted light. The film helps the display system avoid consuming power to send light that is wasted because the light is not seen. The light from the display is scanned into one or more eyes of a viewer. The steering of the scanner addresses when the viewer (or, in head-mounted display cases, the pupil of the eye of the viewer) moves. The viewer may move sideways (e.g., left-right), up-down (or other lateral directions), as well as forward-backward, as in a varying focal length. The power consumed by the display may thus be low.

The steering addresses field of view and other challenges arising from the production of virtual images. The production of virtual images may lead to a narrow field of view. The field of view of a virtual image is a function of the size of the display. The Bragg grating-based steering may be used to provide holographic, three-dimensional displays, virtual image displays, and other displays that are more compact, insofar as the image is only provided (or seen) at one position. The steering provided by the optical systems described herein provides a suitable field of view without resorting to increasing the size of the display or projector. A suitable field of view may thus be provided while avoiding a bulky design.

The steering may allow the display, camera, or other optical system and, thus, the electronic device, to be compact. For instance, the steering may be useful in head-mounted devices, inasmuch as the electronic device may be sized and shaped to conform to a user's head as a result. In eyeglass examples, the steering may also allow a projector to be spaced from the location of the virtual image, such as along a temple of the eyeglass frame. The steering may be useful in carrying the light rays from a projector offset from the virtual image location in two lateral directions (e.g., laterally outward and rearward). For these and other reasons, the steering may also allow a camera to be positioned in a desirable location in eyeglass and other examples.

The steering may also be helpful in the context of head-mounted displays. The distance between the display and the pupil of the eye of the viewer may vary in accordance with the manner in which the head-mounted display is worn. The pupil of the viewer also moves up-down and left-right. The steering allows a large area beam scanner to be provided in such cases without having to resort to changing the position of the display components.

The large area beam scanning provided by the Bragg grating-based steering may also be used to alter the apparent, or effective, position of a camera. The steering allows the camera to look left, right, up, down, etc. In some cases, the steering is useful to position a camera behind a screen (e.g., a screen of a display). In these and other cases, an optical system may use the steering to present a virtual window, combining a display with a camera. In such cases, the display acts like a window so that a viewer at one location can see through the display to view a remote location, while another viewer at the remote location can do the same in reverse, i.e., through another display at the remote location. The two optical systems both emit light and also capture light. The steering is used such that the light is captured as if the light were imaged by a camera behind (e.g., deep behind) the display. In some cases, the position of the camera matches that of the remote viewer relative to the display at which the remote viewer is looking. A large area beam scanner provided via the steering may then alter the apparent position of the camera behind the screen as the viewer(s) move around. Another film may be provided in such optical systems for steering the output of the display.

The Bragg grating-based steering may be useful in still other optical systems and contexts. For instance, the steering may be used in connection with guiding light. The light may be guided in the display context, the image acquisition context, or other contexts. For instance, displays are ideally flat. So rather than put the camera deep behind the display, the steering may be used to facilitate folding the path of rays between the display and the camera into a thin wedge waveguide. The rays are coupled into a wedge-shaped guide if the rays are incident at a sufficiently small angle to the guide surface. Under these circumstances, the rays are redirected through almost 90° in many cases. Such redirection may be achieved for a wide range of wavelengths using the Bragg grating-based steering described herein.

Although described below in connection with near-eye or head-mounted devices, the internal support may be used in connection with a wide variety of displays and other electronic devices. The size and form factor of the electronic devices may vary considerably. The display of the electronic devices may range from those presented by other wearable devices (e.g., a wristwatch) to large-scale heads-up displays (e.g., wall-mounted displays) for various applications.

Figures 1, 2:
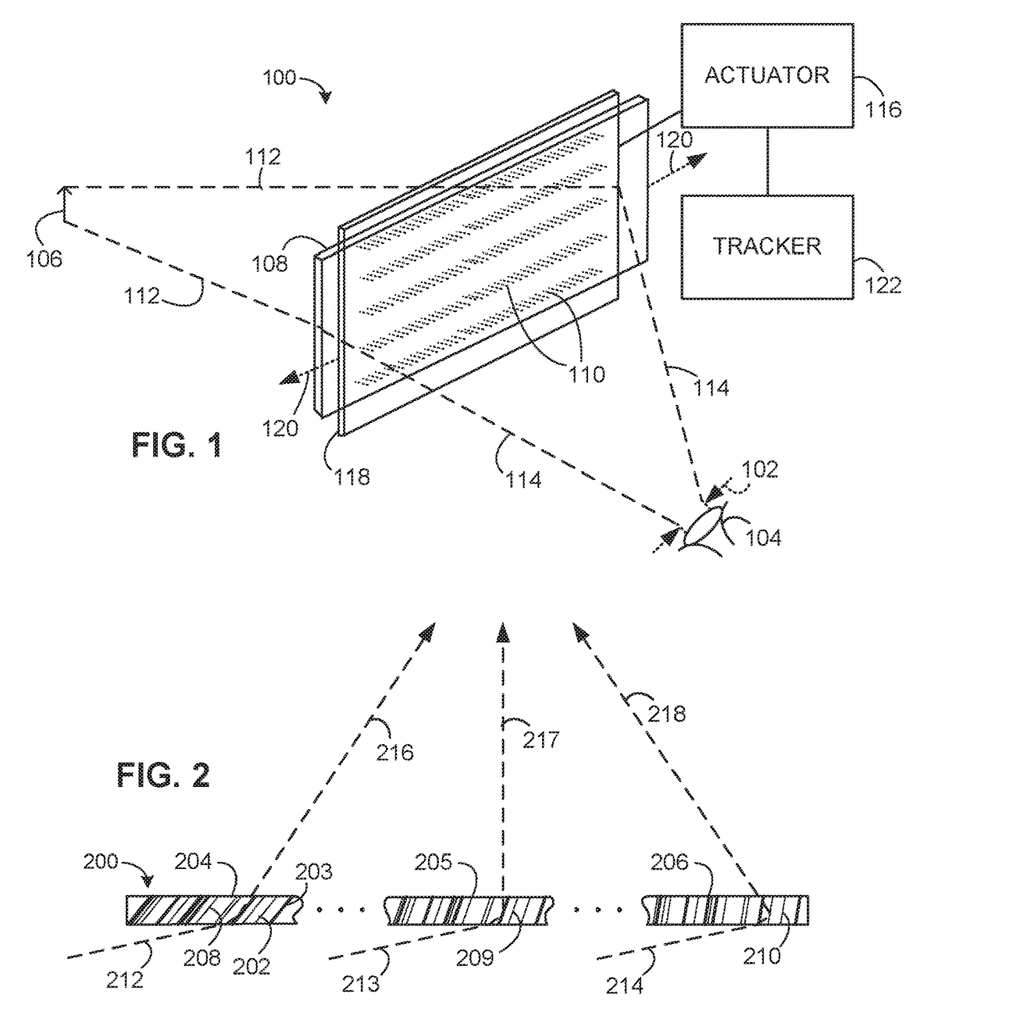
FIG. 1 is a schematic view of an optical system with a plurality of Bragg gratings to which shear forces are applied for pupil steering in accordance with one example.
FIG. 2 is a schematic view of a film of the optical system of FIG. 1 to depict in greater detail the plurality of Bragg gratings in accordance with one example.

FIG. 1 shows an optical system 100 configured for steering of a pupil 102. The optical system 100 may be configured for image display or image acquisition. In this example, the pupil 102 is associated with a viewer 104. In other cases, the pupil 102 may be associated with a camera or image acquisition device. The optical system 100 may accordingly be configured as, or include, a display and/or a camera. The optical system 100 may thus include a number of components directed to image display or acquisition in addition to those shown.

The optical system 100 includes a light source 106. In FIG. 1, the light source 106 is schematically depicted as an object for ease in depiction. In some cases, the light source 106 is or includes a display, such as a scanned beam display configured to generate a virtual image. For example, the light source 106 may be or include a pupil of a projected image. The light source 106 may include any number of optical elements and other components (e.g., a projector) configured to generate the pupil or other virtual image. Examples of such displays, including the optical elements and components thereof, are described below in connection with FIGS. 4-6.

The optical system 100 includes a film 108 positioned to be illuminated by light from the light source 106. The film 108 may thus be disposed between the light source 106 and the viewer 104, e.g., along the optical path between the light source 106 and the viewer 104. In the example of FIG. 1, the light source 106 and the viewer 104 are disposed on opposite sides of the film 108. In other cases, the optical path is folded such that one or more components of the light source 106 (e.g., a projector) are disposed on the same side of the film 108 as the viewer 104.

The film 108 includes a plurality of Bragg gratings 110 configured to redirect the light from the light source 106 toward the pupil 102. In the schematic depiction of FIG. 1, incident light rays 112 propagate from the light source 106 to illuminate the film 108. The incident light rays 112 are redirected as light rays 114 by respective Bragg gratings 110 of the plurality of Bragg gratings 110. Each light ray 114 is emitted from the film 108 in a direction (e.g., at an angle relative to the surface normal) established by the respective Bragg grating 110 excited by the respective incident light ray 112.

Each Bragg grating 110 may be disposed within the volume, or bulk, of the film 108, rather than be disposed along the surface of the film 108 as, for instance, a surface relief grating. Each Bragg grating 110 may be or include a volume hologram recorded in the film 108. The film 108 may thus be considered or configured as, or include, a holographic film. The volume hologram is established by, and includes, regions of altered refractive index periodically spaced apart from one another. Examples of regions of altered refractive index are schematically shown and described in greater detail in FIG. 2. Examples of the manner in which the Bragg gratings 110 are formed are described below.

The redirection provided by the Bragg gratings 110 establishes the position of the pupil 102 at which the light rays 114 converge. For instance, the respective Bragg grating 110 excited by a respective one of the incident light rays 112 redirects the respective incident light ray 114 in a direction corresponding with the propagation direction of one of the light rays used to record the hologram of the respective Bragg grating 110. Recording the plurality of Bragg gratings 110 allows the position of the pupil 102, or the point of convergence, of the emitted light rays 114 to be established for a range of angles of incidence.

To adjust the position of the pupil 102, the optical system 100 includes an actuator 116 configured to apply a shearing force to the film 108. The actuator 116 may be a piezoelectric actuator, but the type, configuration, and other characteristics of the actuator 116 may vary considerably. As described below, multiple actuators 116 may be included to apply respective shearing forces. The shearing force manipulates an orientation of the plurality of Bragg gratings 110 to change an extent to which the plurality of Bragg gratings 110 redirects the incident light rays 112 and to thereby re-position the pupil 102 at which the incident light rays 112 converge after redirection by the plurality of Bragg gratings 110.

The optical system 100 includes one or more transparent plates 118 disposed along the film 108. In the example of FIG. 1, a single transparent plate 118 is depicted, e.g., for ease in illustration. Each plate 118 may be or include a glass plate. Other rigid materials may be used. The composition, configuration, and other characteristics of the plates 118 may vary. The actuator 116 is configured to move the transparent plate 118 laterally in, for instance, a lateral direction 120 to apply the shearing force to the film 108. The amount of movement may be on the order of 100 microns, such as about 100 microns, but other movement amounts may be used. For instance, the movement may be up to about 100 microns. The lateral direction, in this case, is a left-right, or side-to-side, direction. In some cases, a uniform, or same, shearing force is applied along the entire lateral extent of the film 108. The uniform shearing force shears the entire film 108 equally in a plane shared by the normals to the Bragg planes of the Bragg gratings 110. Shearing the film 108 equally in the direction 120 moves the pupil 102 side-to-side in the lateral direction 120.

The film 108—or another film—may present another plurality of Bragg gratings to be sheared in another direction, such as the up-down direction orthogonal to the direction 120, to move the pupil 102 in that direction. For instance, the optical system 100 may include a further film illuminated by the incident light, a further transparent plate adjacent the further film, and a further actuator to apply sharing forces to the further film via the further transparent plate. The Bragg planes of the Bragg gratings in the further film are oriented at an angle (e.g., 45 degrees or 90 degrees) to the Bragg planes of the Bragg gratings in the film 108.

The shearing forces may be variably applied to the film 108 to move the pupil 102 forward and backward. The distance between the film 108 and the pupil 102 may thus be adjusted. To this end, the shearing force varies across the lateral extent of the film 108. A variable shearing force may be provided via multiple actuators and plates, as described below. The shearing forces may thus steer the position of the pupil 102 continuously in three-dimensional space relative to the film 108.

The pupil 102 may be moved by the shearing forces to accommodate the position of the viewer 104. For instance, the pupil 102 may correspond with the pupil of an eye of the viewer 104. In such cases, the optical system 100 may be a component of an eyeglass or other head-mounted device worn by the viewer 104. The shearing force continuously adjusts the position of the pupil 102 to match the eye pupil of the viewer 104. To that end, the optical system 100 includes a pupil tracker 122 configured to acquire data indicative of a position of the eye pupil of the viewer 104 of the optical system 100. The pupil tracker 122 may include a camera or other image capture device directed at the eye of the viewer 104. A controller or other processor (FIG. 10) configured to control the actuator 116 based on the acquired data may also be included in the optical system 100.

The movement of the transparent plate 120 may be transferred to the film 108 in various ways. For example, in some cases, the transparent plate 118 is adhesively attached to the film 108. Alternatively or additionally, the shearing force is applied to the film 108 via friction between the transparent plate 120 and the film 108. The transparent plate 120 may engage the film 108 in other ways. For example, engagement may be established via other contact and/or attachment techniques.

The film 108 may be flat and flexible. The film 108 may have a low shear modulus. For instance, the shear modulus may fall in a range from about 0.4 KiloPascal (kPa) to about 300 kPa. In some cases, the film is composed of, or includes, polydimethlysiloxane (PDMS). For example, the PDMS may be arranged as a polysilicone gel substrate. The substrate or other film 108 may be sufficiently thin to allow shearing. For example, the PDMS film may have a thickness that falls in a range from about 25 microns to about 250 microns. Other thicknesses and materials may be used. For instance, the film 108 may include di-chromated gelatin and/or a photopolymer, such as BAYFOL® HX200 (available commercially from Covestro AG), and HRF-150 (available commercially from DuPont), with thicknesses falling in the above-noted range. The composition of the film 108 may also provide a sufficient degree of photosensitivity to allow the Bragg gratings 110 to be formed (e.g., holograms to be recorded). For instance, the PDMS (or other film material) may be mixed with a photo-actuator, such as benzophenone. Subsequent treatment of the film 108 may render the material(s) of the film 108 no longer photosensitive.

The characteristics of the light source 106 may vary. In some cases, the light source 106 is or includes a display that illuminates the film 108 with collimated light. For example, the light source 106 may include and/or act as a scanned beam display having an exit pupil that is re-formed via the optical system 100. Convergence of the emitted light rays 114 is thus provided via the Bragg gratings 110 of the film 108 in such cases. In other cases, the light source 106 includes a backlight unit or other component that generates converging light. The Bragg gratings 110 may or may not be configured to augment the convergence of the emitted light in such cases.

The optical system 100 is not limited to use with redirecting virtual image light to the eye pupil of a viewer, e.g., a viewer of a display. Other types of light and redirection may be accommodated by the optical system 100. For example, the optical system 100 may be configured for use as a camera, examples of which are described below. In those cases, the optical system 100 is used to steer light rays from a scene (e.g., a scene including the viewer of the display) to a camera behind the display, or effectively behind (e.g., deep behind) the display. In some of those cases, both the camera and the backlight unit are disposed behind the display. The camera and/or the backlight unit may be transparent or otherwise invisible to one another.

FIG. 2 depicts a film 200 having a plurality of Bragg gratings 202 in accordance with one example. The film 200 may correspond with the film 108 (FIG. 1) or another film described or otherwise referenced herein. The Bragg gratings 202 may accordingly correspond with the plurality of Bragg gratings 110 (FIG. 1) or another plurality of Bragg gratings described or otherwise referenced herein.

The plurality of Bragg gratings 202 are superposed over one another within the film 200. Each Bragg grating 202 includes a series of refractive index variations arranged in and along Bragg planes 203. The Bragg planes 203 of a respective one of the Bragg gratings 202 are parallel planes periodically spaced apart from one another in accordance with the spatial frequency of Bragg grating 202. The spatial frequency of the respective Bragg grating 202 is determinative of the angle and wavelength of the incident light that will be redirected by the Bragg grating 202. That is, the respective Bragg grating 202 acts as a mirror with regard to a respective continuum of incident angle (or input angle relative to the normal of the Bragg planes) and wavelength combinations for which the cosine of the input angle is proportional to the wavelength of the light. Thus, the only Bragg planes that will be excited (i.e., meet the Bragg condition) are those that diffract such that the output angle equals the input angle, as with a mirror. Other wavelengths and angles of incident light do not excite the hologram of the respective Bragg grating 202, therefore, are not redirected by the respective Bragg grating 202.

The series of refractive index variations along the Bragg planes 203 may be formed via an iterative recording procedure. Signal and reference light beams are used to form the hologram of each Bragg grating 202. Each Bragg grating 202 is formed by allowing the two light beams to interfere within the holographic film 200. When the film 200 is subsequently illuminated by a ray with the same direction and wavelength as the signal beam, then the ray is redirected (e.g., diffracted) to the direction of the reference beam. The iterative procedure includes changing the angle between the signal and reference beams so that Bragg gratings 202 of different spatial frequencies are realized. For instance, once an axis to which all of the Bragg planes 203 will be perpendicular is selected, light from a laser beam is passed through a 50:50 beam splitter and other optics such that the two emitted beams meet within the holographic film 200. While maintaining the angle between each beam and the selected axis, the iterative procedure steadily increases the angle relative to the normal of the Bragg planes, while recording gratings at regular intervals. Once finished with the recording for each Bragg grating 202, the film 202 may be treated so that the film 202 is no longer photosensitive.

The Bragg planes 203 are depicted in FIG. 2 with varying widths to indicate regions of the film 200 in which the index variations of multiple Bragg gratings 202 have overlapped. The amount of refractive index change present at any one point in the film 200 may thus increase as additional Bragg gratings 202 are recorded in superposition upon one another. The wider Bragg planes 203 are thus representative of greater refractive index variation from the initial refractive index of the film 200.

The Bragg gratings 202 have varying spatial frequencies such that a spectrum of wavelengths in the light are redirected by the plurality of Bragg gratings. Ideally, the spatial frequencies vary from 0 to infinity. In practice, a broad, yet finite spectrum of spatial frequencies is provided. In one example, the spatial frequencies vary from about one-half wavelength to about two wavelengths, which correspond with a difference between the signal and reference beams of near zero degrees and plus-or-minus 25 degrees, respectively. Other examples of a broad spectrum of Bragg gratings may be used. For instance, the film 200 may include Bragg gratings 202 with spatial frequencies greater than two wavelengths.

The superposition of the Bragg gratings 202 of different spatial frequencies may thus result in what appears to be a random conglomeration of planes in the film 200 of different refractive index. Each individual Bragg grating 202 nonetheless remains functional despite the superposition and overlap. Collectively, the group of Bragg gratings 202 allows a wide range of wavelengths and incident angles to be redirected by the film 200.

Three portions 204-206 of the film 200 are shown in schematic cross-section. The portions 204-206 may correspond with two outer segments 204, 206 and an inner segment 205, or any other portions of the film 200. A respective subset of adjacent Bragg gratings 202 is disposed in each portion 204-206. Thus, the Bragg gratings 202 in the portion 204 are not considered to be adjacent to the Bragg gratings 202 in the portion 205. In this example, each portion 204-206 includes a superposition of respective subsets 208-210 of adjacent Bragg gratings 202. The Bragg planes 203 of the adjacent Bragg gratings 202 within each subset 208-210 are parallel with one another. The Bragg gratings 202 may accordingly be considered locally parallel. Non-local Bragg gratings 202 may have non-parallel Bragg planes in some cases, as described below.

In the example of FIG. 2, the Bragg gratings 202 facilitate the convergence of the light emitted therefrom. To that end, the Bragg planes 203 of non-adjacent Bragg gratings 202 are oriented at different angles—i.e., the Bragg planes are not in parallel with one another. As shown in FIG. 2, the angle at which the Bragg planes 203 are oriented in the portion 204 differs the angle at which the Bragg planes 203 are oriented in the portion 205. In this case, the Bragg planes 203 in the portion 205 are closer to the direction of the surface normal. The orientation of the Bragg planes 203 in the portion 206 is closer still to the surface normal direction. The orientation of the Bragg planes 203 thus varies across the lateral extent of the film 200. The Bragg gratings 202 are accordingly configured to emit converging light. Incident rays illuminating respective Bragg gratings 202 are thus re-directed toward the pupil, even in cases in which the incident rays are collimated before illuminating the film 200.

The different orientations of the Bragg planes 203 result in different emission angles for the different portions 204-206 of the film 200. As shown in FIG. 2, three parallel light rays 212-214 are incident upon the film 200. The incident rays 212-214 are incident upon the portions 204-206, respectively. The Bragg planes 203 within the portions 204-206 diffract the incident rays 212-214 in different directions. The incident rays 212-214 are redirected and emitted as converging light rays 216-218, respectively. The rays 216-218 converge to a pupil, as described above in connection with FIG. 1.

The orientations of the Bragg planes in the portions 204-206 are then adjusted (e.g., rotated) via the application of shear forces to steer the location of the pupil. The adjustments may be uniform (e.g., same amount of rotation across the respective portions 204-206) or varying (e.g., different amounts of rotation across the respective portions 204-206). Uniform adjustments steer the pupil side-to-side and/or up-down. Varying adjustments allow for steering in the depth direction in addition to the side-to-side and up-down steering.

In other cases, the Bragg planes 203 in the portions 204-206 are all initially parallel (i.e., before shear force-based steering). For example, a respective one of the Bragg gratings 202 in the portion 204 and a respective one of the Bragg gratings 202 in the portion 206 have parallel Bragg planes. With parallel Bragg planes, the Bragg gratings 202 thus do not facilitate or otherwise cause the convergence of the light. In such cases, the light rays incident on film 200 are pre-converging rather than parallel as shown in the example of FIG. 2.

Figure 3:
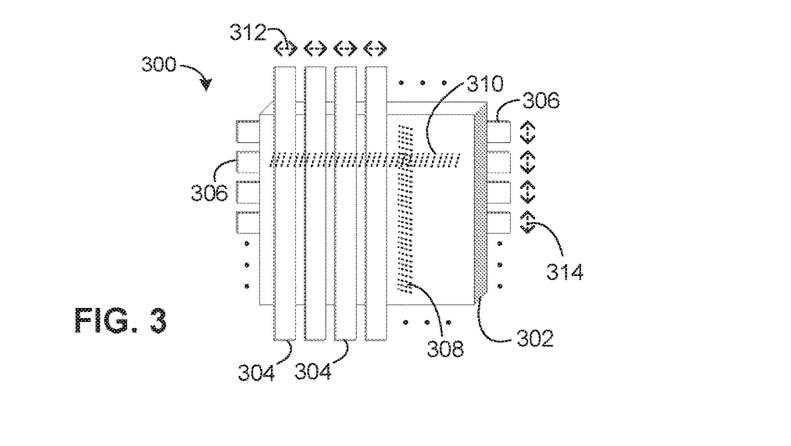
FIG. 3 is a schematic view of an optical system having an array of plates for variable shear force application in accordance with one example.

FIG. 3 depicts an optical system 300 in which varying shear forces are applied to a film 302. The shear forces are varied via separate or independent movement of a plurality of plates 304, 306. Each plate 304, 306 may be transparent as described above. A limited number of examples of each plate 304, 306 are depicted in FIG. 3 for ease in illustration. The plates 304, 306 may substantially cover an entire lateral extent of the film 302. The plates 304, 306 are disposed on or along opposite sides of the film 302. Each plate 304, 306 may be driven by a respective actuator, such as a piezoelectric actuator as described above in connection with FIG. 1. Varying the magnitude of the shear forces applied to the plates 304, 306 adjusts the extent to which the light is steered by Bragg grating sets 308, 310 superposed in the film 302. The adjustment allows the distance at which the light converges after redirection by the Bragg grating sets 308, 310 in the film 302 (e.g., the distance between the film 302 and the pupil) to be changed. The Bragg grating set 308, 310 may thus steer the pupil the forward-backward dimension as well as laterally (e.g., side-to-side or upward-downward). Only one example of each Bragg grating set 308, 310 is depicted in FIG. 3 for ease in illustration.

The Bragg grating sets 308, 310 are configured to redirect the light illuminating the film 302 in different directions. The different directions may be orthogonal axes. To that end, the plates 304, 306 and the Bragg grating sets 308, 310 are arranged along different dimensions or axes. The different arrangements of the Bragg planes of the Bragg grating sets 308, 310 support steering along different dimensions. In this case, the plates 304 and the Bragg grating sets 308 are arranged in parallel with, or along, a vertical axis, e.g., in columns. The Bragg grating sets 308 are disposed at a 90 degree angle relative to the plates 306 and the Bragg grating sets 310. The plates 306 and the Bragg grating sets 310 are oriented in parallel with, or along, a horizontal axis, e.g., in rows.

The Bragg grating sets 308 are sheared side-to-side by movements 312 of the plates 304. The movements 312 apply respective shearing forces along the horizontal axis. The movements 312 thus steer the pupil side-to-side (e.g., left-right). The location of the pupil is also steered upward-downward by the shearing of the Bragg grating sets 310 by movements 314 of the plates 306. The movements 314 apply respective shearing forces in a vertical direction. The movements 312, 314 may be schematically representative of respective actuators configured to move the plates 304, 306 along the horizontal and vertical axes. The axes or directions of the movements 312, 314 may differ from one another by more or less than 90 degrees in other cases.

Other plate and grating orientations may be used. For instance, the plates 304 and the Bragg grating sets 308 may be oriented at a 45 degree angle relative to the plates 306 and the Bragg grating sets 310. The plates 304, 306 may thus not be oriented in rows and columns as described above and shown in FIG. 3.

In some cases, each Bragg grating set 308, 310 may be associated with a respective one of the plates 304, 306. The respective plate 304, 306 may thus individually control the redirection provided by the respective Bragg grating set 308, 310. Other arrangements may be used. For instance, in some cases, two or more of the Bragg grating 308, 310 sets may be associated with a respective one of the plates 304, 306.

Each Bragg grating set 308, 310 may be disposed within the film 302 in a manner such that only one of the plates 304, 306 can apply a shearing force. For example, the Bragg grating sets 308, 310 may be disposed closer to one side of the film 302 so that only the plates 304 or the plates 306 may apply shearing forces thereto. The depth of the Bragg grating sets 308, 310 may be less than the thickness of the film 302.

In other cases, the two sets 308, 310 of parallel Bragg gratings are not superposed in a single film. For instance, a separate film may be provided for each Bragg grating set. The plates 304 may then be disposed adjacent one of the films, while the plates 306 are disposed adjacent the other one of the films.

Figure 4:
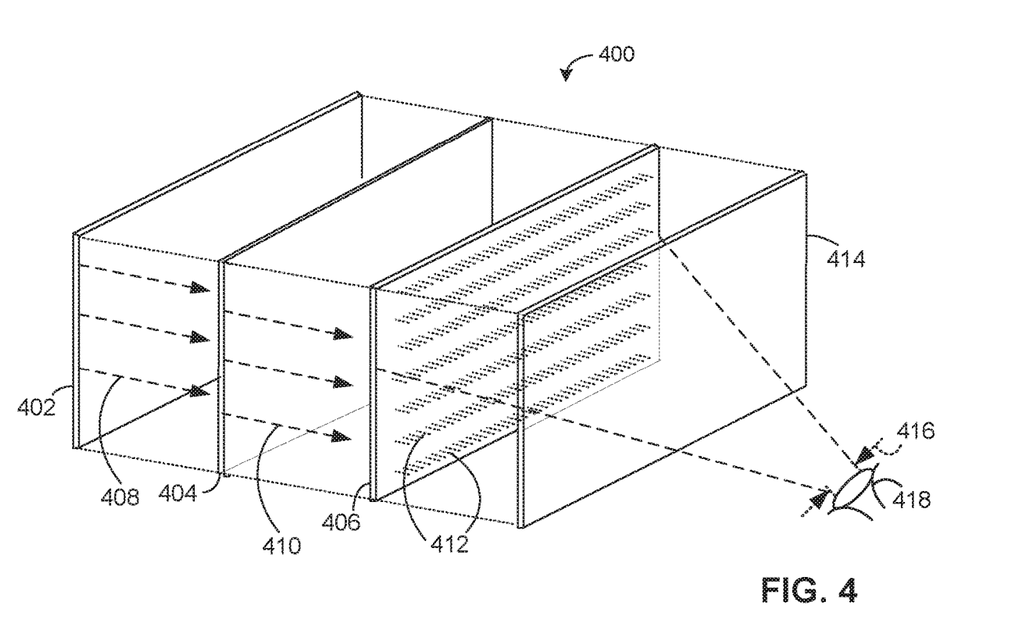
FIG. 4 is a schematic view of a virtual image display with a plurality of Bragg gratings to which shear forces are applied to re-position a pupil at which display light converges in accordance with one example.
Figure 5:
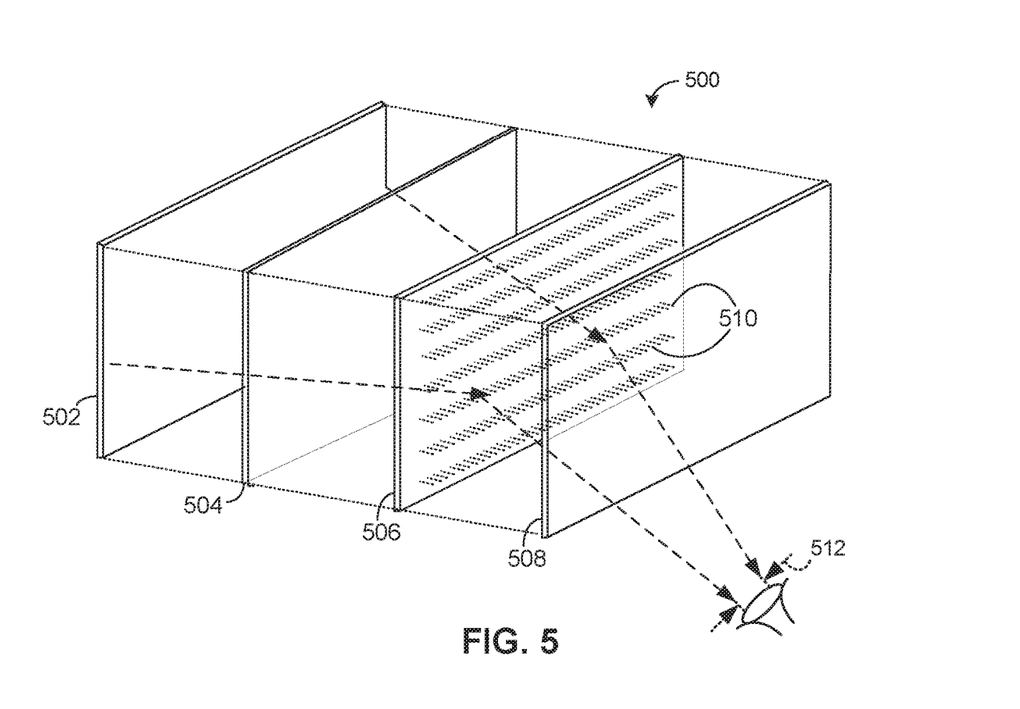
FIG. 5 is a schematic view of another virtual image display having a backlight unit that provides converging light to a plurality of Bragg gratings to which shear forces are applied in accordance with one example.
Figure 6:
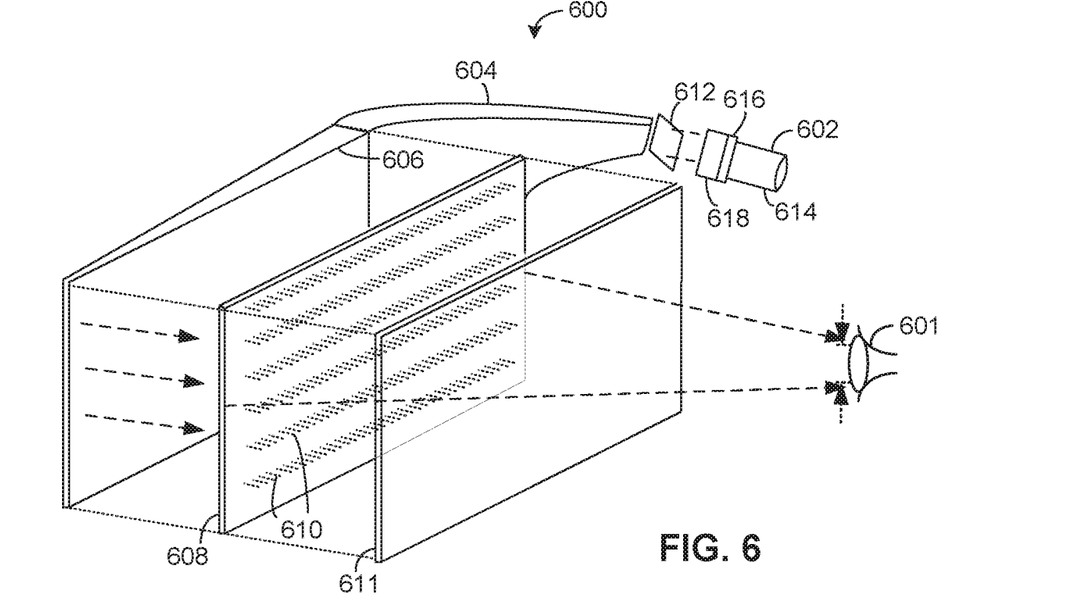
FIG. 6 is a schematic view of a scanned beam virtual image display with a plurality of Bragg gratings to which shear forces are applied to re-position a pupil at which display light converges in accordance with one example.

FIGS. 4-6 depict examples of display devices having optical system steering. Each display device uses Bragg grating shear as described above to steer the location at which light converges after passing through the optical system. The light may thus be redirected to the location of a pupil of a viewer of the display device. As a result, in each case, a large image may be provided by the display device while maintaining a power- and space-efficient system.

FIG. 4 depicts a display device 400 having a backlight unit 402, a liquid crystal (LC) panel 404, and a steering film 406. The backlight unit 402 generates light 408 that illuminates the LC panel 404. The LC panel 404 modulates the light 408 to generate image light 410 that, in turn, illuminates the steering film 406. The steering film 406 may be configured as, or include, any of the films described herein. Thus, the steering film 406 includes one or more sets 412 of Bragg gratings. The sets 412 of Bragg gratings may be arranged in different directions, e.g., in rows and columns, as described above. Shearing forces applied to the film 406 via a number of transparent plates 414 steer a location 416 at which the image light 410 converges. The location 416 may correspond with the location of a pupil of a viewer 418 of the display device 400.

The plates 414 are depicted in simplified form as a single, monolithic plate for ease in illustration. The plates 414 may include any number of plates disposed on one or both of the sides of the steering film 406. In still other cases, the display device 400 includes multiple films 406 to handle steering in different directions (e.g., side-to-side and upward-downward).

In the example of FIG. 4, the backlight unit 402 is configured such that the light 408 is collimated light. The construction, configuration, and characteristics of the backlight unit 402 may vary. For example, in some cases, the backlight unit 402 may be or include one or more light emitting diodes (LEDs) that inject light into a thin end of a transparent wedge, examples of which are described in Travis et al. "Collimated Light from a Waveguide for a Display Backlight," Opt. Express 17, 19714-19719 (2009), the entire disclosure of which is hereby incorporated by reference. Alternatively or additionally, the backlight unit 402 is configured such that laser light is injected into a slab guide embossed with shallow surface relief gratings, examples of which are described in Travis et al. "Virtual image display as a Backlight for 3D," Opt. Express 21, 17730-17735 (2013), the entire disclosure of which is hereby incorporated by reference. Other sources of collimated backlight may be used instead of the backlight unit 402. For example, light sources such as one or more LEDs may be placed in the focal plane of a Fresnel lens.

The backlight unit 402 and the LC panel 404 may be replaced by an emissive display panel in other cases. For example, an organic light emitting display (OLED) panel may be used to generate and provide collimated image light to the steering film 406. In such cases, the OLED panel may generate laser light or be combined with other optical elements (e.g., a lenslet array) for collimation. Still other types of collimated light sources may be used.

The steering film 406 is configured to converge the collimated image light 410 in the process of redirecting the image light 410. To that end, the sets of Bragg gratings 412 have locally (but not universally) parallel Bragg planes, as described above in connection with the examples of FIG. 2. The initial (pre-shearing) orientation of the Bragg planes thus varies across the lateral extent of the film 406 to cause the collimated image light 410 to converge toward the desired location 416. In one example, differences in Bragg plane orientation can be observed over distances of about 10-30 millimeters.

FIG. 5 depicts a display device 500 in accordance with another example. The display device 500 may be similar to the display device 400 (FIG. 4) in many respects. For instance, the display device 500 includes a backlight unit 502, an LC panel 504 illuminated by the backlight unit 502, and a steering film 506 that redirects the image light provided by the LC panel 504. A number of transparent plates 508 are disposed along the steering film 506 to apply shear forces to Bragg grating sets 510 within the steering film 506 to adjust a location 512 at which the light converges.

The display device 500 differs from the example of FIG. 4 in that the light generated by the backlight unit 502 is converging light. The light from the backlight unit 502 may be converging both horizontally and vertically. The manner in which the backlight unit 502 provides the converging light may vary. For instance, the backlight unit 502 may be configured as described above, but with a Fresnel or other lens or other optical element configured to have focal power, such as a turning film in the wedge case or a surface relief grating in the slab guide case.

In the example of FIG. 5, the steering film 506 is not configured to converge the light. The Bragg planes of the Bragg grating sets 510 may thus initially (pre-shearing) be universally parallel across the entire lateral extent of the steering film 506. With the light already converging, any redirection provided by the steering film 506 is accordingly directed to repositioning the location 512.

In other cases, the Bragg grating sets 510 may be configured to provide some convergence. For instance, the Bragg grating sets 510 may augment the convergence provided by the backlight unit 502. Alternatively or additionally, the Bragg grating sets 510 may be responsible for converging the light either horizontally or vertically, while the backlight unit 502 handles the other convergence direction. For example, the light rays provided by the backlight unit 502 (or other light source) may be converging along one dimension, but not converging along the other dimension. The steering film 506 may thus provide the flexibility to use a variety of different types of light sources.

The display devices 400, 500 may be useful in the context of non-head-mounted displays, such as handheld devices (e.g., mobile phones and tablets) and other large form factor devices. For example, the display device 400 may provide a display for a laptop computer, computer monitor, television, or other desktop or wall-mounted device.

FIG. 6 depicts a display device 600 in accordance with another example in which collimated light is redirected through Bragg grating shearing. In this case, light of a virtual image to be provided to a viewer 601 is generated by a projector 602. The projector 602 may be a scanned beam projector. The display device 600 further includes one or more light guides 604, 606 to guide a scanned beam (or other virtual image light) from the projector 602 so that the virtual image light illuminates a steering film 608 having Bragg grating sets 610. As described herein, shear forces are applied to the Bragg grating sets 610 by a number of transparent plates schematically depicted at 611. The light guide(s) 604, 606 may be configured to provide collimated light to the steering film 608, in which case the steering film 608 is configured to converge the virtual image light as described herein.

In the example of FIG. 6, the waveguide 604 is a curved waveguide and the waveguide 606 is a wedge guide. In other cases, the waveguides 604, 606 may be integrated with one another to form a curved wedge guide (e.g., with a near constant radius of curvature). The curvature of the waveguide 604 (and/or other guide) may be useful if the projector 602 is disposed in a location off to the side and/or in front of viewer 601 and/or other components of the display device 600, such as the steering film 608. The display device 600 may thus be useful in head-mounted and other near-eye display contexts.

The wedge guide 606 may be tapered to emit the light after a number of reflections within the wedge guide 606. The number of reflections may be determined in accordance with the angle at which the light is injected into the guide 604. Further details regarding the construction, configuration, operation, and other characteristics of the wedge guide 606 are set forth in U.S. Patent Publication No. 2011/0044582 ("Efficient Collimation of Light with Optical Wedge," and U.S. Patent Publication No. 2016/0195720 ("Virtual Image Display with Curved Light Path," the entire disclosures of which are hereby incorporated by reference. In other cases, other extraction techniques are used to emit light that illuminates the steering wedge 608. For example, the guide 606 may have a constant thickness but a variation in refractive index that results in light extraction.

The projector 602 may inject the light into the light guide 604 at an injection angle that determines the point at which the light is emitted from the wedge guide 606. In the example of FIG. 6, the light is injected into the guide 604 after reflecting off of a mirror 612 (e.g., a 45 degree mirror). In some cases, the mirror 612 may be used to establish the injection angle. For example, the mirror 612 may be rotatable or otherwise moveable. After reflecting off the mirror, the light travels through the curved guide 604. The mirror 612 may include additional optical elements (e.g., a lens) to capture and/or direct the light at the desired injection angle.

The projector 602 may include one or more lasers or other light sources. In the example of FIG. 6, the projector 602 includes a single laser 614. The projector 602 may also include one or more liquid crystal layers, as described above. In this example, the projector 602 includes a liquid crystal grating 616 and a liquid crystal display 618. The liquid crystal display 618 may include or be configured as a liquid crystal on silicon (LCoS) or other LC or other device.

Other optical elements may be added to the display device 600. For example, the display device 600 may include a combiner to allow other light (e.g., ambient light) to be presented to the viewer 601 with the virtual image light.

Figure 7:
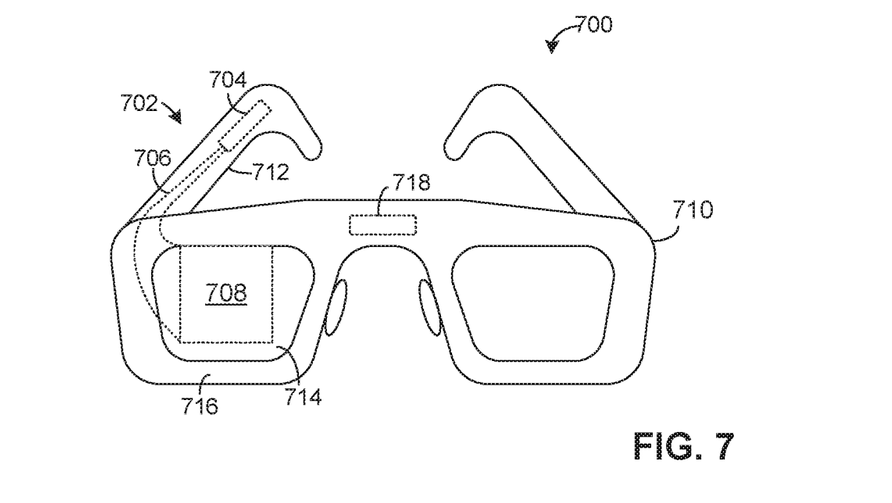
FIG. 7 is a schematic, perspective view of a wearable electronic device having one or more optical systems configured to implement pupil steering and/or field of view steering in accordance with one example.

FIG. 7 depicts an example of a head-mounted electronic device 700 in which a display system 702 is incorporated. The display system 702 may include optical system components for pupil steering as described herein. For instance, the display system 702 may correspond with the display device 600 of FIG. 6. In this case, the device 700 is configured to be worn as eyeglasses or other eyewear, with the display system 702 disposed on one side of the eyewear for a single eye. The display system 702 may be replicated for the other side, such that virtual images are generated for both eyes. In some cases, the same virtual image is generated for each eye. In other cases (e.g., stereoscopic imaging), the virtual images may differ. One or more components of the display system 702 may be shared by the two sides of the electronic device 700.

The display system 702 includes a projector 704, a light guide 706, and an optical steering system 708. The optical steering system 708 is configured for pupil steering via Bragg grating shearing as described herein. The projector 704 is optically coupled to the optical system 708 by the light guide 706. Each of the projector 704, the light guide 706, and the optical steering system 708 may be mounted on, incorporated within, or otherwise carried by an eyeglass frame 710 of the electronic device 700. In this example, the projector 704 is disposed within or on a temple 712 of the frame 710. The light guide 706 may extend along and/or within the temple 712 to reach the optical steering system 708. In this example, the optical steering system 708 is disposed within a viewing area 714 defined by a rim 716 of the frame 710.

The projector 704 is configured to provide light of a virtual image. For example, the projector 704 may include one or more liquid crystal panels to produce the light of the virtual image. In this example, the projector 704 is mounted on a component of a frame 710 of the eyeglasses. The light of the virtual image may be injected into the light guide 706 at an injection angle by the projector 704. The injection angle may be determinative of the point or position at which the light is extracted or emitted from the light guide 706. The light guide 706 may include one or more guides as described above. In some cases, one or more of the guides, such as a wedge guide, may be adjacent to the optical steering system 708.

The projector 704 may be mounted or otherwise disposed at different locations on or within the frame 710. For example, the projector 704 may be disposed at a distal end or at a proximate end (e.g., near the rim 716) of the temple 712.

The light guide 706 constrains the light of the virtual image as the light travels through total internal reflection (TIR) from the projector 704 to reach the optical steering system 708. The light guide 706 thus folds up the optical path between the projector 704 and the optical steering system 708. The light guide 706 may include multiple sections to extend beyond the temple 712 and deliver the light to the optical steering system 708.

The optical system 702 may be integrated with the eyeglass frame 710 or other structural components of the electronic device 700 in various ways. One or more elements of the display system 702 may be externally mounted on the structural component(s). Alternatively or additionally, one or more elements are internal or otherwise disposed within or integrated with the structural components. For example, one or more sections of the light guide 706 may be disposed within the eyeglass frame 710.

A number of electronic control components of the electronic device 700 are schematically shown at 718 in FIG. 7 for ease in illustration. Many of the control components may be arranged in a control module. However, the location(s) of the control module (and/or any other components) may vary considerably from the example shown. The control components 718 may be directed to processing, storage, data capture (e.g., camera for pupil tracking), and power (e.g., battery power). Further details regarding the control components 718 are described and shown in connection with FIG. 10.

The manner in which the electronic device 700 is wearable may vary. Other types of wearable mounts may be used to position the virtual image a short distance in front of the wearer's eyes. For example, the electronic device 700 may include a helmet with a display visor. In these and other cases, the electronic device 700 may include one or more lenses, filters, and/or other optical elements disposed in or near the viewing area. The lenses or other elements may be configured to correct the focus and/or other aspects of the projected images for the comfort and vision needs of the wearer.

Figure 8:
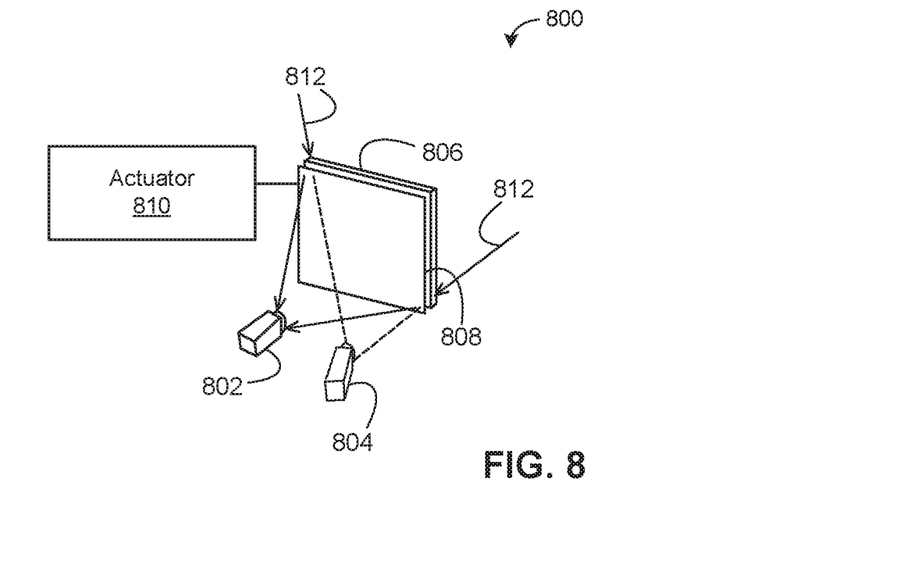
FIG. 8 is a schematic view of an optical system with a plurality of Bragg gratings configured to redirect light for an image to be acquired in accordance with one example.

FIG. 8 depicts an optical system 800 in which Bragg grating-based steering is applied in the context of image acquisition. The optical system 800 may be considered similar to the above-described optical systems in reverse. The optical system 800 includes a camera 802, or other image acquisition device, in place of a projector. The optical system 800 may use the Bragg grating-based steering to adjust the effective position and orientation of the camera 802. As shown in FIG. 8, the camera 802 has an effective, virtual or imaginary camera position 804.

The optical system 800 includes a steering film 806, one or more transparent plates 808 disposed along, and in contact with, the film 806, and one or more actuators 810 configured to adjust position(s) of the transparent plate(s) 808 such that shearing force(s) is/are applied to the film 806. The film 806 is illuminated by light rays 812 emanating from an object scene, an image of which is to be acquired by the camera 802. The light rays 812 are directed toward the effective camera position 804 as shown. The steering film 806 includes Bragg grating sets configured to redirect the light as described above.

The camera 802 is positioned relative to the film 806 to receive the light rays 812 after the light rays 812 are redirected by the film 806. The shearing force(s) manipulate(s) an orientation of the Bragg grating sets to re-position the location of the field of view from which the light rays 812 travel before illuminating the film 806 and before redirection by the Bragg gratings. The light thus converges at the actual position of the camera 802.

Figure 9:
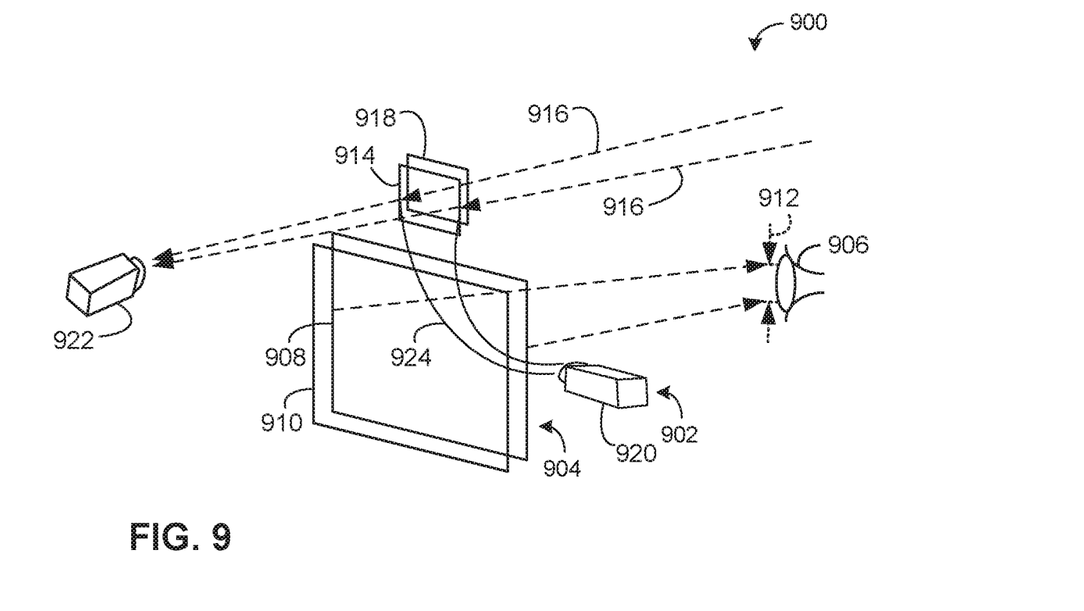
FIG. 9 is a schematic view of an optical system having a steerable display and a steerable camera based on Bragg grating shearing in accordance with one example.

FIG. 9 depicts an optical system 900 that applies Bragg grating-based steering in connection with both virtual image display and image acquisition. The optical system 900 includes a steerable camera 902 and a steerable display 904, each of which may be configured for Bragg grating shearing in accordance with the example optical systems described herein. The steerable display 904 provides a virtual image to a viewer 906, while the steerable camera 902 acquires an image of the object scene in which the viewer 906 is disposed.

The steerable display 904 includes a light source, such as a projector. The light source provides virtual image light that illuminates a steering film 908. The steering film 908 includes multiple sets of Bragg gratings, as described above. The steering film 908 may be positioned as described above to receive the virtual image light. The steerable display 904 includes a number of transparent plates 910 to apply shearing force(s) from one or more corresponding actuators. As described above, the shearing force(s) manipulate(s) an orientation of the Bragg grating sets to change an extent to which the film 908 redirects the light, thereby re-positioning a pupil at which the virtual image light converges. The shearing force(s) thus steer a location 912 to which the steering film 908 redirects the virtual image light, and at which the virtual image light converges. The location 912 may correspond with the position of a pupil of the viewer 906.

The steerable camera 902 includes a steering film 914 illuminated by light 916 from the object scene for which an image is to be acquired. The steering film 914 includes sets of Bragg gratings as described above. The steerable camera 902 also includes one or more transparent plates 918 to apply shearing force(s) from one or more corresponding actuators. The steering provided by the film 914 directs a field of view of the object scene light to a camera 920 or other image acquisition device. The camera 920 is disposed relative to the film 914 to receive the object scene light 916 after the object scene light is redirected by the film 914. As described above, the shearing force(s) manipulate(s) an orientation of the Bragg grating sets to re-position the location of the field of view from which the object scene light travels before illuminating the film 914 and before redirection by the Bragg gratings to form a second pupil at the image acquisition device at which the object light converges.

The redirection of the object scene light establishes the position of an effective or virtual camera 922. The effective camera position 922 may be located substantially behind the display-related components. The redirection may thus be useful in that a more compact electronic device can be realized (e.g., by enabling a single camera to do the work previously handled by multiple cameras). The actual position of the camera 920 may be laterally offset or otherwise closer to the display-related components.

The redirection of the object scene light may alternatively or additionally be useful in establishing a periscope arrangement for the device 900. The steering film 914 of the camera 902 may be configured and relied upon to steer the object scene light around the steerable display 904. In the example of FIG. 9, the steering film 914 is laterally offset from the steerable display 904 and used to redirect the object scene light into a light guide 924. The light guide 924 may include wedge and curved sections as described above in connection with the examples of FIG. 6. The steering film 914 may be useful in such cases to establish a suitable injection angle for the object scene light so that the object scene light is guided by the light guide 924. The rays of the object scene light may thus be coupled into a wedge-shaped guide because the rays will be incident at a sufficiently small angle to the guide surface. The steering film 914 may thus facilitate a considerable amount of redirection (e.g., almost 90 degrees) toward the camera 920. The steering film 914 may thus be considered to establish a two-way optical system, or window, through which two viewers can observe the object scene in which the other viewer is disposed.

In other cases, such two-way optical systems include a transparent display through which the object scene light travels before reaching the steering film 914 of the steerable camera 902. The steering film 914 may not be laterally offset from the display components in such cases. A transparent display may also be combined with optical systems having a steering film only for image acquisition, such as the examples described in connection with FIG. 8.

Various optical systems are described in which pupil steering is implemented via Bragg grating shear. Films in which a spectrum of Bragg gratings are formed are disposed for illumination by light to be redirected. The films may be placed over, in front of, or otherwise adjacent to a surface or other element that emits the light. In some cases, the light converges to a point. In other cases, the redirection provides the convergence. The Bragg gratings accordingly have Bragg planes that are either universally or locally parallel. In order to move the point sideways, the entire film is sheared equally in a plane shared by the normal to the Bragg planes. In order to move the point forward and back, some areas of the film are sheared more or less than others. Shearing different areas of the film by different extents thus allows the film to act as a lens whose focal point can be steered sideways, up and down, and forward-backward.

The steering films described herein may be integrated into various types of optical systems and electronic devices. For instance, the steering film may be combined with a collimated backlight so as to create a display that uses very little optical power. The steering film may be combined with a three-dimensional or other virtual image so as to steer the pupil of that image to follow the viewer. A wide field of view may be achieved without having to resort to undesirably large displays, which may be useful in realizing head-mounted and other portable displays. The steering film may also be combined with a wedge periscope so as to steer the position of the point towards which captured rays travel prior to deflection.

Figure 10:
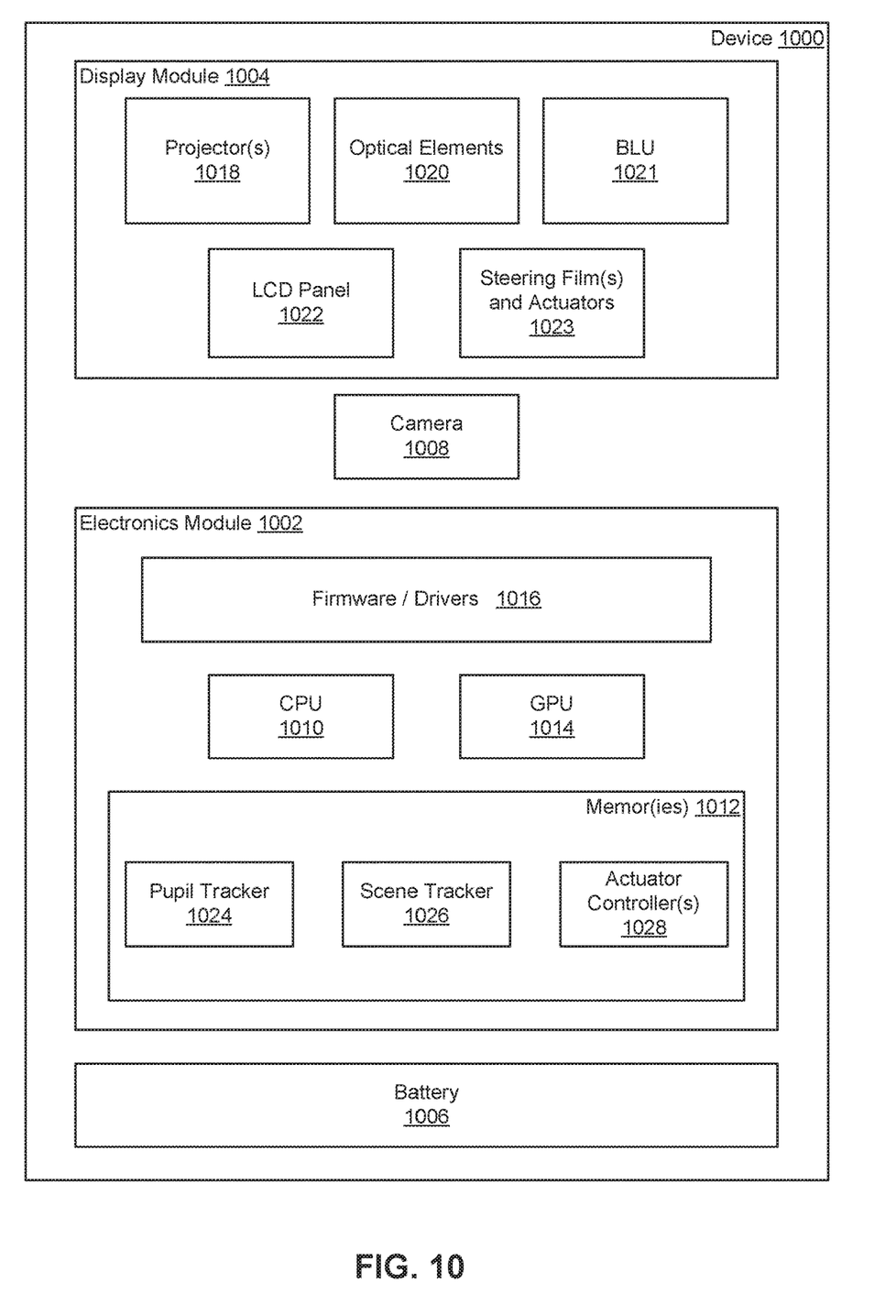
FIG. 10 is a block diagram of the wearable electronic device of FIG. 9 to depict in greater detail the optical systems and other components configured to implement pupil steering and/or field of view steering in accordance with one example.

FIG. 10 shows an example of an electronic device 1000 into which the above-described Bragg grating-based steering may be useful. The electronic device 1000 includes an electronics module 1002 and a display module 1004 (or system), a battery 1006, and a camera 1008. The electronic device 1000 may include additional, fewer, or alternative components. For example, the display module 1004 may be integrated with the electronics module 1002 and/or other components of the electronic device 1000 to a varying extent. For instance, the electronics module 1002 and/or the display module 1004 may include a graphics subsystem of the electronic device 1000. Any number of display modules or systems 1004 may be included. For example, one display system 1004 may be provided for each eye of the viewer. Each display system 1004 may be configured in accordance with one or more of the examples described above.

The camera 1008 is configured to capture data indicative of an image of a pupil of a viewer viewing the display of the device 1000. Alternatively, the camera 1008 is configured to capture data indicative of an object scene. In some cases, multiple cameras are provided for both purposes. The camera 1008 may be any image capture device, including, for instance, a charge coupled device (CCD) image sensor or an active pixel sensor, such as a CMOS sensor. The camera 1008 may also be configured to generate data indicative of pupil position. Such data may be alternatively or additionally generated by the electronics module 1002.

In this example, the electronics module 1002 includes a processor 1010 and one or more memories 1012 separate from the display module 1004. The processor 1010 and the memories 1012 may be directed to executing one or more applications implemented by the device 1000. For example, the display module 1004 may generate a user interface for an operating environment (e.g., an application environment) supported by the processor 1010 and the memories 1012. The processor 1010 may be a general-purpose processor, such as a central processing unit (CPU), or any other processor or processing unit. Any number of such processors or processing units may be included.

In the example of FIG. 10, the electronics module 1002 includes a graphics processing unit (GPU) 1014 and firmware and/or drivers 1016. The GPU 1014 may be dedicated to graphics- or display-related functionality and/or provide general processing functionality. Some of the components of the electronics module 1002 may be integrated. For example, the processor 1010, the one or more of the memories 1012, the GPU 1014, and/or the firmware 1016 may be integrated as a system-on-a-chip (SoC) or application-specific integrated circuit (ASIC). The electronics module 1002 may include additional, fewer, or alternative components. For example, the electronics module 1002 may not include a dedicated graphics processor, and instead rely on the CPU 1010 or other general-purpose processor to support the graphics-related functionality of the electronic device 1000. The electronics module 1002 and/or the display module 1004 may include additional memory (or memories) to support display-related processing.

In the example of FIG. 10, the display module 1004 includes one or more projectors 1018, a number of optical components 1020 (e.g., mirrors), a backlight unit (BLU) 1021, one or more LCD panels or units 1022, and one or more steering film assemblies 1023. Each assembly 1023 includes one or more transparent plates and corresponding actuators 1023 in addition to one or more films. The projector 1018 may be configured as described above.

Additional, fewer, or alternative display components may be provided. For example, in some cases, such as those that use scanning, the display module 1004 does not include the backlight unit 1021. In some cases, one or more of the LCD panels or units are integrated within the projector(s) 1018. The display module 1004 may include a number of other components, including, for instance, a number of passive optical components, such as light guides through which light for a virtual image travels from a projector to reach the steering film(s) 723, as described above.

The operation of the display module 1004 and the camera 1008 may be controlled by the electronics module 1002 through the execution of a number of computer-readable instructions (or instruction sets) stored in the memories 1012. Any portion of the instruction sets may be executed by the processor 1010 or the GPU 1014. In this example, the instructions include modules or other instruction sets for a pupil tracker 1024, a scene tracker 1026, and an actuator controller 1028.

In operation, the camera 1008 may be controlled by and otherwise exchange data with the pupil tracker 1024. Through the instructions of the pupil tracker 1024, the processor 1010 may be configured to determine a position of the pupil based on the data captured by the camera 1008. The processor 1010 may also be configured via the instructions of the scene tracker 1026 to select a field of view for which an image is to be captured by the camera 1008.

Additional, fewer, or alternative instruction sets or modules may be provided. For example, the device 1000 may have instructions stored either for controlling the BLU 1021, the projector 1018, and other display components.

The device 1000 may be configured as one of a wide variety of electronic devices, including, but not limited to, near-eye or other wearable computing or electronic devices, such as eyeglasses, visors, or other head-mounted devices. The device 1000 may also be configured as a heads-up electronic display device. Still other possible devices include various types of small-sized displays that nonetheless have a large field of view. Such devices may include wearable and non-wearable devices that may be brought up close to the eye by the user for viewing, as in, for instance, a wristwatch. Still other examples include tabletop, desktop, wall-mounted, and other large form factor devices.

In one aspect, an optical system includes a light source, a film positioned to be illuminated by light from the light source, the film including a plurality of Bragg gratings configured to redirect the light, and an actuator configured to apply a shearing force to the film. The shearing force manipulates an orientation of the plurality of Bragg gratings to change an extent to which the plurality of Bragg gratings redirects the light and to thereby re-position a pupil at which the light converges after redirection by the plurality of Bragg gratings.

In another aspect, an optical system includes a film illuminated by light for an image to be acquired, the film including a plurality of Bragg gratings configured to redirect the light, a transparent plate disposed along, and in contact with, the film, an actuator configured to adjust a position of the transparent plate such that a shearing force is applied to the film, and an image acquisition device disposed relative to the film to receive the light after the light is redirected by the film. The shearing force manipulates an orientation of the plurality of Bragg gratings to re-position a location of a field of view from which the light travels before illuminating the film and before redirection by the plurality of Bragg gratings to form a pupil at the image acquisition device at which the light converges.

In yet another aspect, an electronic device includes a steerable display including a light source, a first film positioned to receive virtual image light from the light source, and a first actuator configured to apply a first shearing force to the first film, and a steerable camera including a second film illuminated by object light for an image to be acquired, a second actuator configured to apply a shearing force to the second film, and an image acquisition device disposed relative to the film to receive the object light after the object light passes through the film. The first and second films include first and second pluralities of Bragg gratings, respectively. The first shearing force manipulates an orientation of the first plurality of Bragg gratings to change an extent to which the first plurality of Bragg gratings redirects the light and to thereby re-position a first pupil at which the virtual image light converges. The second shearing force manipulates an orientation of the second plurality of Bragg gratings to re-position a location of a field of view from which the object light travels before illuminating the film and before redirection via the plurality of Bragg gratings to form a second pupil at the image acquisition device at which the object light converges.

In connection with any one of the aforementioned aspects, the electronic device may alternatively or additionally include any combination of one or more of the following aspects or features. The plurality of Bragg gratings have varying spatial frequencies such that a spectrum of wavelengths in the light are re-directed by the plurality of Bragg gratings. The plurality of Bragg gratings include first and second Bragg gratings, the first and second Bragg gratings having respective Bragg planes oriented at different angles such that the first and second Bragg gratings re-direct respective rays of the light toward the pupil, the respective rays being collimated before illuminating the film. The plurality of Bragg gratings include first and second Bragg gratings, the first and second Bragg gratings having respective Bragg planes adjacent and parallel to one another. The optical system further includes a transparent plate disposed along the film. The actuator is configured to move the transparent plate to apply the shearing force to the film. The transparent plate is adhesively attached to the film. The optical system further includes first and second transparent plates disposed along opposite sides of the film. The actuator is a first actuator configured to move the first transparent plate along a first axis to apply the shearing force to the film along the first axis. The optical system further includes a second actuator configured to move the second transparent plate along a second axis differing from the first axis to apply a further shearing force to the film along the second axis. The optical system further includes a plurality of plates disposed along the film. Each plate of the plurality of plates is oriented in a respective row. The actuator is one of a plurality of actuators. Each actuator of the plurality of actuators is configured to move a respective plate of the plurality of plates to apply a respective shearing force to the film. The respective shearing forces differ from one another to vary a distance between the film and the pupil. The plurality of plates is a first plurality of plates disposed along a first side of the film. The optical system further includes a second further plurality of plates disposed along a second side of the film opposite the first side. The optical system further includes a further plurality of actuators configured to apply respective shearing forces to the film via the second plurality of plates. Each plate of the second plurality of plates is oriented in a different direction than the first plurality of plates. The plurality of Bragg gratings is a first plurality of Bragg gratings. The film includes a second plurality of Bragg gratings. The first and second pluralities of Bragg gratings are configured to redirect the light along first and second orthogonal axes, respectively. The optical system further includes a pupil tracker configured to acquire data indicative of a position of a pupil of a viewer of the optical system, a controller configured to control the actuator based on the acquired data. The light source is configured such that the light is collimated light. The light source includes a backlight unit configured to generate collimated light, and a display unit illuminated by the collimated light and configured to provide the light that illuminates the film. The light source includes a projector configured to generate virtual image light and a wedge guide configured to guide the virtual image light to illuminate the film. The light generated by the light source is converging light. The optical system of claim 16, further comprising a transparent display through which the light travels before reaching the film. The optical system further includes a display laterally offset from the film, and a periscope configured to redirect the light from the field of view around the display. The periscope includes the film to redirect the light from the field of view, and a wedge guide to guide the light from the field of view. The second film is laterally offset from the steerable display and configured to steer the object light around the steerable display.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An optical system comprising:
    a light source;
    a film positioned to be illuminated by light from the light source, the film comprising a plurality of Bragg gratings configured to redirect the light;
    a transparent plate; and
    an actuator for moving the transparent plate to apply a shearing force to the film;
    wherein the shearing force manipulates an orientation of the plurality of Bragg gratings to change an extent to which the plurality of Bragg gratings redirects the light and to thereby re-position a pupil at which the light converges after redirection by the plurality of Bragg gratings.

2. The optical system of claim 1, wherein the plurality of Bragg gratings have varying spatial frequencies such that a spectrum of wavelengths in the light are re-directed by the plurality of Bragg gratings.

3. The optical system of claim 1, wherein the plurality of Bragg gratings comprise first and second Bragg gratings, the first and second Bragg gratings having respective Bragg planes oriented at different angles such that the first and second Bragg gratings re-direct respective rays of the light toward the pupil, the respective rays being collimated before illuminating the film.

4. The optical system of claim 1, wherein the plurality of Bragg gratings comprise first and second Bragg gratings, the first and second Bragg gratings having respective Bragg planes adjacent and parallel to one another.

5. The optical system of claim 1, wherein the transparent plate is adhesively attached to the film.

6. The optical system of claim 1, wherein:
    the optical system further comprises first and second transparent plates disposed along opposite sides of the film;
    the actuator is a first actuator configured to move the first transparent plate along a first axis to apply the shearing force to the film along the first axis; and
    the optical system further comprises a second actuator configured to move the second transparent plate along a second axis differing from the first axis to apply a further shearing force to the film along the second axis.

7. The optical system of claim 1, further comprising a plurality of plates disposed along the film, wherein:
    each plate of the plurality of plates is oriented in a respective row;
    the actuator is one of a plurality of actuators;
    each actuator of the plurality of actuators is configured to move a respective plate of the plurality of plates to apply a respective shearing force to the film; and
    the respective shearing forces differ from one another to vary a distance between the film and the pupil.

8. The optical system of claim 7, wherein:
    the plurality of plates is a first plurality of plates disposed along a first side of the film;
    the optical system further comprises a second further plurality of plates disposed along a second side of the film opposite the first side;
    the optical system further comprises a further plurality of actuators configured to apply respective shearing forces to the film via the second plurality of plates; and
    each plate of the second plurality of plates is oriented in a different direction than the first plurality of plates.

9. The optical system of claim 1, wherein:
    the plurality of Bragg gratings is a first plurality of Bragg gratings;
    the film comprises a second plurality of Bragg gratings; and
    the first and second pluralities of Bragg gratings are configured to redirect the light along first and second orthogonal axes, respectively.

10. The optical system of claim 1, further comprising:
    a pupil tracker configured to acquire data indicative of a position of a pupil of a viewer of the optical system; and
    a controller configured to control the actuator based on the acquired data.

11. The optical system of claim 1, wherein the light source is configured such that the light is collimated light.

12. The optical system of claim 1, wherein the light source comprises:

a backlight unit configured to generate collimated light; and a display unit illuminated by the collimated light and configured to provide the light that illuminates the film.

13. The optical system of claim 1, wherein the light source comprises:

a projector configured to generate virtual image light; and a wedge guide configured to guide the virtual image light to illuminate the film.

14. The optical system of claim 1, wherein the light generated by the light source is converging light.

15. An optical system comprising:

a film illuminated by light for an image to be acquired, the film comprising a plurality of Bragg gratings configured to redirect the light;

a transparent plate disposed along, and in contact with, the film;

an actuator configured to adjust a position of the transparent plate such that a shearing force is applied to the film; and an image acquisition device disposed relative to the film to receive the light after the light is redirected by the film;

wherein the shearing force manipulates an orientation of the plurality of Bragg gratings to re-position a location of a field of view from which the light travels before illuminating the film and before redirection by the plurality of Bragg gratings to form a pupil at the image acquisition device at which the light converges.

16. The optical system of claim 15, further comprising a transparent display through which the light travels before reaching the film.

17. The optical system of claim 15, further comprising:

a display laterally offset from the film; and a periscope configured to redirect the light from the field of view around the display;

wherein the periscope comprises:

the film to redirect the light from the field of view; and a wedge guide to guide the light from the field of view.

18. An electronic device comprising:

a steerable display comprising a light source, a first film positioned to receive virtual image light from the light source, and a first actuator configured to apply a first shearing force to the first film by using a first transparent plate; and a steerable camera comprising a second film illuminated by object light for an image to be acquired, a second actuator configured to apply a shearing force to the second film by using a second transparent plate, and an image acquisition device disposed relative to the film to receive the object light after the object light passes through the film;

wherein:

the first and second films comprise first and second pluralities of Bragg gratings, respectively;

the first shearing force manipulates an orientation of the first plurality of Bragg gratings to change an extent to which the first plurality of Bragg gratings redirects the light and to thereby re-position a first pupil at which the virtual image light converges; and the second shearing force manipulates an orientation of the second plurality of Bragg gratings to re-position a location of a field of view from which the object light travels before illuminating the film and before redirection via the plurality of Bragg gratings to form a second pupil at the image acquisition device at which the object light converges.

19. The electronic device of claim 18, wherein the second film is laterally offset from the steerable display and configured to steer the object light around the steerable display.

* * * * *